(12) United States Patent  
Yu et al.

(10) Patent No.: US 9,158,059 B2  
(45) Date of Patent: Oct. 13, 2015

(54) BACKLIGHT MODULE AND LIQUID CRYSTAL DISPLAY MODULE USING SAME

(71) Applicant: Shenzhen China Star Optoelectronics Technology Co., Ltd., Shenzhen, Guangdong (CN)

(72) Inventors: Gang Yu, Shenzhen (CN); Shihhsiang Chen, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 25 days.

(21) Appl. No.: 14/129,983

(22) PCT Filed: Nov. 29, 2013

(86) PCT No.: PCT/CN2013/088100  
§ 371 (c)(1),  
(2) Date: Dec. 29, 2013

(87) PCT Pub. No.: WO2015/070487  
PCT Pub. Date: May 21, 2015

(65) Prior Publication Data  
US 2015/0138472 A1    May 21, 2015

(30) Foreign Application Priority Data  
Nov. 15, 2013    (CN) .......................... 2013 1 0573189

(51) Int. Cl.  
*F21V 8/00*       (2006.01)  
*G02F 1/1335*     (2006.01)  
*G02F 1/1362*     (2006.01)

(52) U.S. Cl.  
CPC ............ *G02B 6/0085* (2013.01); *G02B 6/0073* (2013.01); *G02F 1/1362* (2013.01); *G02F1/133603* (2013.01); *G02F 1/133608* (2013.01); *G02F 2001/133628* (2013.01); *G02F 2001/136222* (2013.01); *G02F 2201/34* (2013.01)

(58) Field of Classification Search  
CPC ..................... G02F 1/133615; G02B 6/0073  
USPC ............................................ 349/65; 362/612  
See application file for complete search history.

(56) References Cited

U.S. PATENT DOCUMENTS

| | | | |
|---|---|---|---|
| 2008/0239754 A1* | 10/2008 | Kang et al. .................... | 362/617 |
| 2012/0182497 A1* | 7/2012 | Qi et al. ........................... | 349/62 |
| 2012/0294042 A1* | 11/2012 | Sung et al. ..................... | 362/612 |
| 2013/0077026 A1* | 3/2013 | Seo et al. ........................ | 349/65 |

FOREIGN PATENT DOCUMENTS

| | | |
|---|---|---|
| CN | 101105602 A | 1/2008 |
| CN | 101500373 A | 8/2009 |

(Continued)

*Primary Examiner* — Thanh-Nhan P Nguyen  
(74) *Attorney, Agent, or Firm* — Andrew C. Cheng

(57) ABSTRACT

The present invention provides a backlight module and a liquid crystal display module using the backlight module. The backlight module includes: a backplane (2), a backlight source (4) mounted in the backplane (2), and a light guide plate (6) mounted in the backplane (2). The backplane (2) includes a bottom board (22) and a plurality of side boards (24) perpendicularly connected to the bottom board (22). The backlight source (4) includes a circuit board (42) and a plurality of LED lights (44) mounted to and electrically connected with the circuit board (42). The circuit board (42) is mounted to the bottom board (22). The LED lights (44) are arranged at one side of the light guide plate (6). The circuit board (42) includes a first slope surface (422) facing the bottom board (22). A heat dissipation board (8) is arranged between the circuit board (42) and the bottom board (22). The heat dissipation board (8) includes a second slope surface (82) mateable with the first slope surface (422).

15 Claims, 4 Drawing Sheets

(56) References Cited

FOREIGN PATENT DOCUMENTS

| | | |
|---|---|---|
| CN | 102518984 A | 6/2012 |
| CN | 102841458 A | 12/2012 |
| JP | 2007226068 A | 9/2007 |
| WO | WO2009052702 A1 | 4/2009 |

* cited by examiner

BACKLIGHT MODULE AND LIQUID CRYSTAL DISPLAY MODULE USING SAME

BACKGROUND OF THE INVENTION

1. Field of the Invention

The present invention relates to the field of flat panel displaying, and in particular to a backlight module and a liquid crystal display module using the backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal display panel.

Referring to FIG. 1, the side-edge backlight module comprises: a backplane 100, a reflector plate 200 arranged in the backplane 100, a light guide plate 300 arranged on the reflector plate 200, a backlight source 400 arranged in the backplane 100, and a heat dissipation board 500 arranged between the backlight source 400 and the backplane 100. The backplane 100 comprises a bottom board 102 and side boards 104 connected to the bottom board 102. The backlight source 400 is attached via thermal paste (not shown) to the heat dissipation board 500. The heat dissipation board 500 is generally an aluminum board, a copper board, or a graphite patch, which is fixed by screws to the bottom board 102 of the backplane 100. Heat generated by the backlight source 400 is transmitted through the heat dissipation board 500 to the bottom board 102 of the backplane 100 and heat exchange is then performed through the backplane 100 with the surrounding atmosphere to realize heat dissipation. However, the thermal conductivity coefficient of the thermal paste is not great so that the heat dissipation performance of the backlight module is not good and the quality of the backlight module is thus affected.

To cope with the above-discussed problems and to realize bezel thinning of the flat panel displays, a backlight module that is currently available comprises LED packages that are directly mounted to a substrate of a flat panel device, of which the structure is illustrated in FIG. 2. The LED packages are vertically mounted to a PCB (Printed Circuit Board) substrate 700 so that an outer circumferential frame of a bezel of a liquid crystal display can be arranged as a slim frame. Further, a heat dissipation board 900 is arranged under the PCB substrate 700 for timely dissipation of the heat generated by the PCB module so as to ensure the quality of clear image displayed by the liquid crystal panel.

However, arranging the heat dissipation board 900 under the PCB substrate 700 would undoubtedly increase the overall thickness of the liquid crystal display. This is adverse to the trend of thinning of the liquid crystal displays. Thus, improvement is desired.

SUMMARY OF THE INVENTION

An object of the present invention is to provide a backlight module, which has a reduced thickness, facilitates bezel narrowing, and provides bettered effect of heat dissipation.

Another object of the present invention is to provide a liquid crystal display module, which has a reduced thickness, a narrowed bezel, and excellent heat dissipation and shows improved quality.

To achieve the above object, the present invention provides a backlight module, which comprises: a backplane, a backlight source mounted in the backplane, and a light guide plate mounted in the backplane. The backplane comprises a bottom board and a plurality of side boards perpendicularly connected to the bottom board. The backlight source comprises a circuit board and a plurality of LED (Light-Emitting Diode) lights mounted to and electrically connected with the circuit board. The circuit board is mounted to the bottom board. The LED lights are arranged at one side of the light guide plate. The circuit board comprises a first slope surface facing the bottom board. A heat dissipation board is arranged between the circuit board and the bottom board. The heat dissipation board comprises a second slope surface matable with the first slope surface. The first slope surface and the second slope surface are set overlapping each other so as to have the circuit board and the heat dissipation board collectively constitute a flat plate like structure. The light guide plate is supported on the flat plate like structure.

The heat dissipation board is made of aluminum.

The backlight module further comprises a reflector plate arranged between the bottom board and the light guide plate and an optic film assembly arranged on the light guide plate.

The light guide plate comprises a bottom surface facing the bottom board, a top surface arranged opposite to the bottom surface, and a plurality of side surfaces arranged between the bottom surface and the top surface. The plurality of side surfaces comprises at least a light incidence surface. The LED lights is arranged beside the light incidence surface.

The present invention also provides a liquid crystal display module, which comprises: a backlight module, a mold frame mounted on the backlight module, and a liquid crystal display panel mounted on the mold frame. The backlight module comprises: a backplane, a backlight source mounted in the backplane, and a light guide plate mounted in the backplane. The backplane comprises a bottom board and a plurality of side boards perpendicularly connected to the bottom board.

The backlight source comprises a circuit board and a plurality of LED (Light-Emitting Diode) lights mounted to and electrically connected with the circuit board. The circuit board is mounted to the bottom board. The LED lights are arranged at one side of the light guide plate. The circuit board comprises a first slope surface facing the bottom board. A heat dissipation board is arranged between the circuit board and the bottom board. The heat dissipation board comprises a second slope surface matable with the first slope surface. The first slope surface and the second slope surface are set overlapping each other so as to have the circuit board and the heat dissipation board collectively constitute a flat plate like structure. The light guide plate is supported on the flat plate like structure.

The heat dissipation board is made of aluminum.

The backlight module further comprises a reflector plate arranged between the bottom board and the light guide plate and an optic film assembly arranged on the light guide plate.

The light guide plate comprises a bottom surface facing the bottom board, a top surface arranged opposite to the bottom surface, and a plurality of side surfaces arranged between the bottom surface and the top surface. The plurality of side surfaces comprises at least a light incidence surface. The LED lights are arranged beside the light incidence surface.

The liquid crystal display panel comprises a TFT (Thin-Film Transistor) substrate, a CF (Color Filter) substrate laminated on the TFT substrate, and a liquid crystal layer interposed between the TFT substrate and the CF substrate.

The TFT substrate comprises a first substrate, a thin-film transistor formed on one surface of the first substrate, and a first polarizer plate formed on an opposite surface of the first substrate and the CF substrate comprises a second substrate, a color filter film formed on a surface of the second substrate, and a second polarizer plate formed on an opposite surface of the second substrate.

The present invention further provides a liquid crystal display module, which comprises: a backlight module, a mold frame mounted on the backlight module, and a liquid crystal display panel mounted on the mold frame, the backlight module comprising: a backplane, a backlight source mounted in the backplane, and a light guide plate mounted in the backplane, the backplane comprising a bottom board and a plurality of side boards perpendicularly connected to the bottom board, the backlight source comprising a circuit board and a plurality of LED (Light-Emitting Diode) lights mounted to and electrically connected with the circuit board, the circuit board being mounted to the bottom board, the LED lights being arranged at one side of the light guide plate, the circuit board comprising a first slope surface facing the bottom board, a heat dissipation board being arranged between the circuit board and the bottom board, the heat dissipation board comprising a second slope surface matable with the first slope surface, the first slope surface and the second slope surface being set overlapping each other so as to have the circuit board and the heat dissipation board collectively constitute a flat plate like structure, the light guide plate being supported on the flat plate like structure;

wherein the heat dissipation board is made of aluminum.

The backlight module further comprises a reflector plate arranged between the bottom board and the light guide plate and an optic film assembly arranged on the light guide plate.

The light guide plate comprises a bottom surface facing the bottom board, a top surface arranged opposite to the bottom surface, and a plurality of side surfaces arranged between the bottom surface and the top surface. The plurality of side surfaces comprises at least a light incidence surface. The LED lights is arranged beside the light incidence surface.

The liquid crystal display panel comprises a TFT (Thin-Film Transistor) substrate, a CF (Color Filter) substrate laminated on the TFT substrate, and a liquid crystal layer interposed between the TFT substrate and the CF substrate.

The TFT substrate comprises a first substrate, a thin-film transistor formed on one surface of the first substrate, and a first polarizer plate formed on an opposite surface of the first substrate and the CF substrate comprises a second substrate, a color filter film formed on a surface of the second substrate, and a second polarizer plate formed on an opposite surface of the second substrate.

The efficacy of the present invention is that the present invention provides a backlight module and a liquid crystal display module using the backlight module, in which a first slope surface is provided on a circuit board of a backlight source and a second slope surface that mates the first slope surface is provided on the heat dissipation board, whereby with the first and second slope surfaces overlapping each other, the circuit board and the heat dissipation board collectively constitute a flat plate like structure with a light guide plate being directly supported on the flat plate like structure so as to reduce the overall thickness of the backlight module and at the same time to increase the contact area between the circuit board and the heat dissipation board to effectively improve the heat dissipation performance. Further, the circuit board is mounted on a bottom board of a backplane so as to effectively reduce the distance between the light guide plate and a side board of the backplane to facilitate bezel narrowing.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
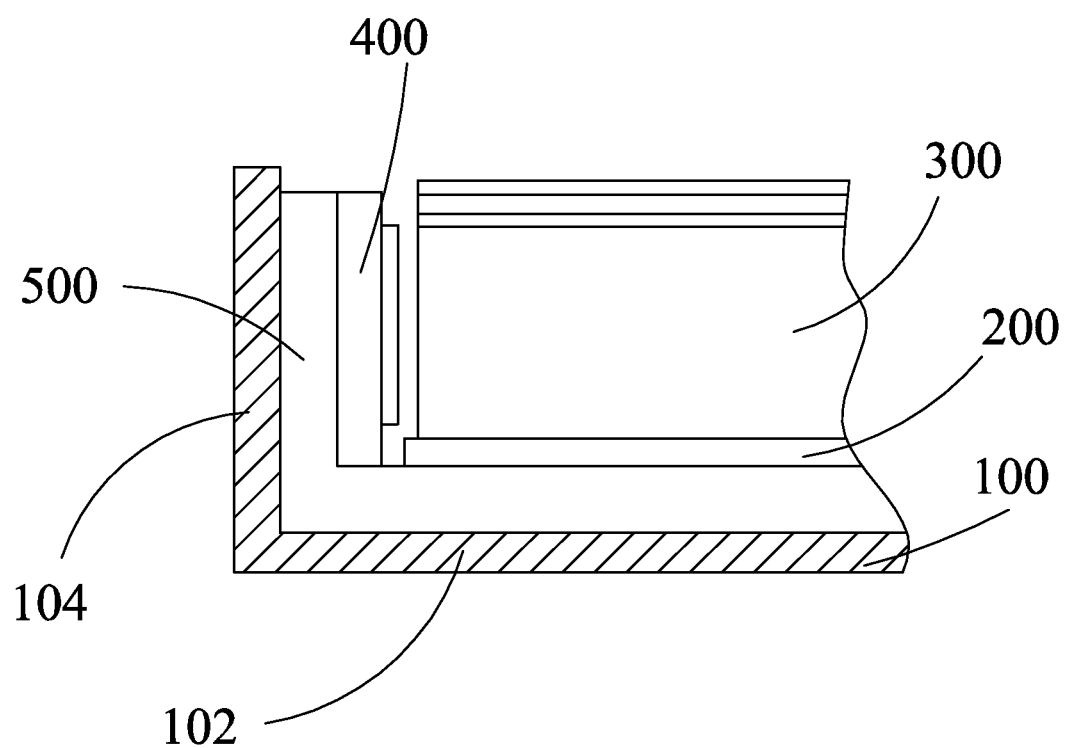
FIG. 1 is a schematic view showing a conventional backlight module.
Figure 2:
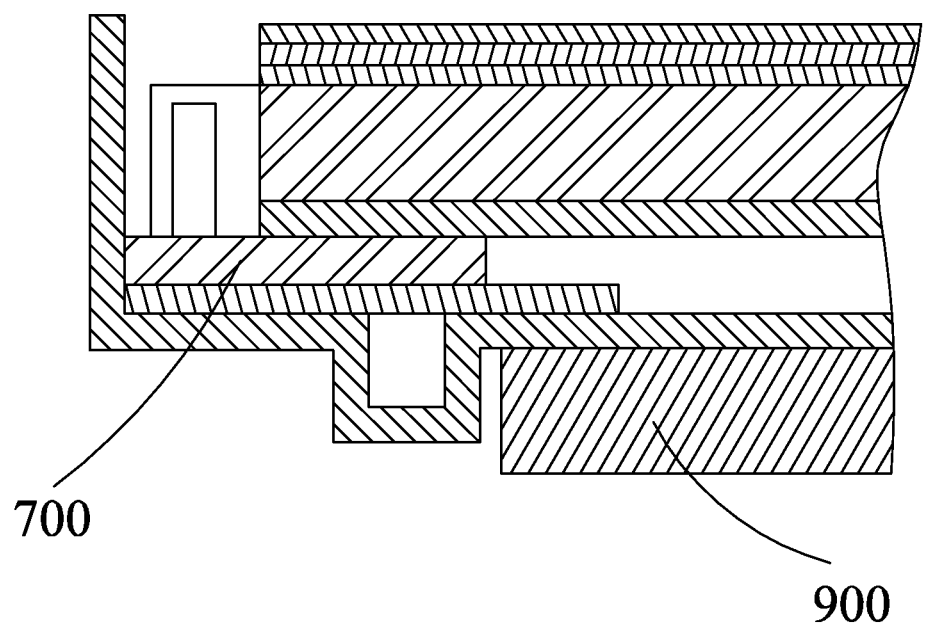
FIG. 2 is a schematic view showing another conventional backlight module.
Figure 3:
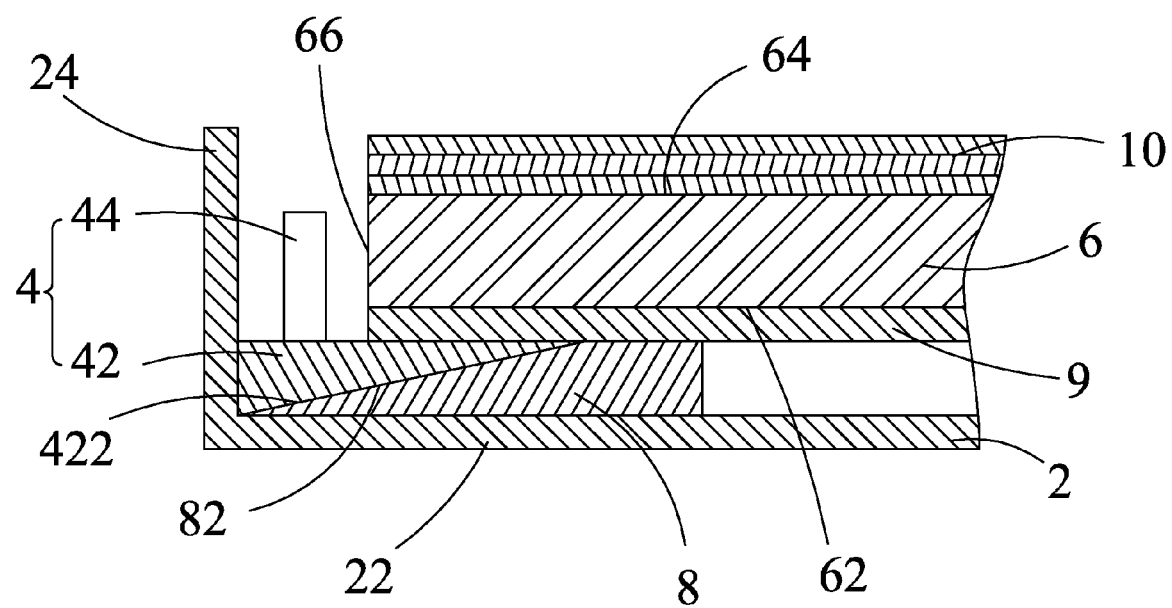
FIG. 3 is a schematic view showing a backlight module according to the present invention.

Referring to FIG. 3, the present invention provides a backlight module, which comprises: a backplane 2, a backlight source 4 mounted in the backplane 2, and a light guide plate 6 mounted in the backplane 2. The backplane 2 comprises a bottom board 22 and a plurality of side boards 24 perpendicularly connected to the bottom board 22. The backlight source 4 comprises a circuit board 42 and a plurality of LED (Light-Emitting Diode) lights 44 mounted to and electrically connected with the circuit board 42. The circuit board 42 is mounted to the bottom board 22. The LED lights 44 are arranged at one side of the light guide plate 6. The circuit board 42 comprises a first slope surface 422 facing the bottom board 22. A heat dissipation board 8 is arranged between the circuit board 42 and the bottom board 22. The heat dissipation board 8 comprises a second slope surface 82 mateable with the first slope surface 422. The first slope surface 422 and the second slope surface 82 are set overlapping each other so as to have the circuit board 42 and the heat dissipation board 8 collectively constitute a flat plate like structure. The light guide plate 6 is supported on the flat plate like structure. While the overall thickness of the backlight module is reduced, the contact area between the circuit board 42 and the heat dissipation board 8 is increased to thereby enhance the heat dissipation performance. Further, in the instant embodiment, the heat dissipation board 8 is made of aluminum that has better heat conductivity so as to further improve the heat dissipation performance and enhance the quality of the backlight module.

The light guide plate 6 comprises a bottom surface 62 facing the bottom board 22, a top surface 64 arranged opposite to the bottom surface 62, and a plurality of side surfaces arranged between the bottom surface 62 and the top surface 64. The plurality of side surfaces comprises at least a light incidence surface 66. The LED lights 44 are arranged beside the light incidence surface 66 so as to form a side-edge backlight module. In the side-edge backlight module, the circuit board 42 is mounted on the bottom board 22 of the backplane 2 so as to effectively reduce the distance between the light guide plate 6 and the side boards 24 of the backplane 2 to facilitate bezel narrowing.

It is noted that the backlight module of the present invention may further comprise a reflector plate 9 arranged between the bottom board 22 and the light guide plate 6 and an optic film assembly 10 arranged on the light guide plate 6. The reflector plate 9 reflects light emitting from the backlight source 4 to enhance the illumination intensity of the backlight module. The optic film assembly 10 functions to homogenize light projecting from the light guide plate 6 so as to enhance the quality of the backlight module.

Figure 4:
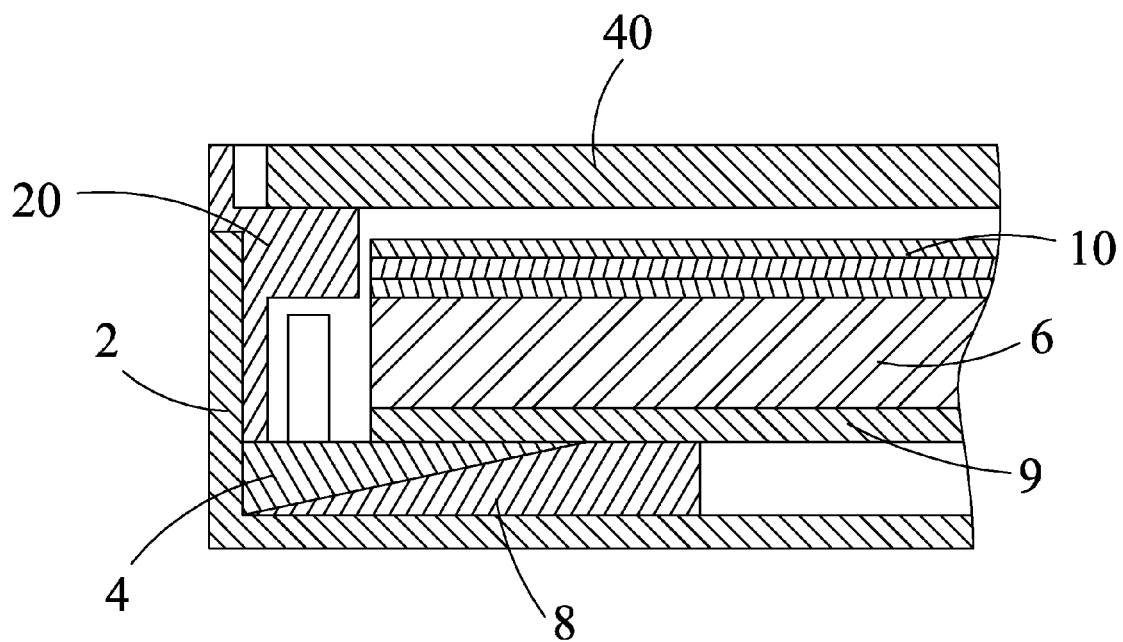
FIG. 4 is a schematic view showing a liquid crystal display module according to the present invention.
Figure 5:
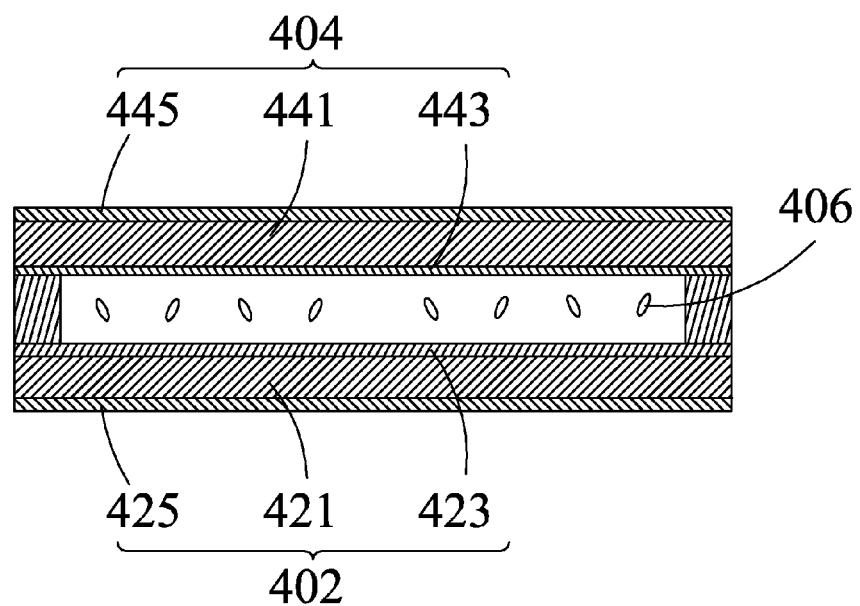
FIG. 5 is a schematic view showing a liquid crystal display panel of FIG. 4.

Referring to FIGS. 4 and 5, with additional reference to FIG. 3, the present invention further provides a liquid crystal display module, which comprises: a backlight module, a mold frame 20 mounted on the backlight module, and a liquid crystal display panel 40 mounted on the mold frame 20.

The backlight module comprises: a backplane 2, a backlight source 4 mounted in the backplane 2, and a light guide plate 6 mounted in the backplane 2. The backplane 2 comprises a bottom board 22 and a plurality of side boards 24 perpendicularly connected to the bottom board 22. The backlight source 4 comprises a circuit board 42 and a plurality of LED (Light-Emitting Diode) lights 44 mounted to and electrically connected with the circuit board 42. The circuit board 42 is mounted to the bottom board 22. The LED lights 44 are arranged at one side of the light guide plate 6. The circuit board 42 comprises a first slope surface 422 facing the bottom board 22. A heat dissipation board 8 is arranged between the circuit board 42 and the bottom board 22. The heat dissipation board 8 comprises a second slope surface 82 mateable with the first slope surface 422. The first slope surface 422 and the second slope surface 82 are set overlapping each other so as to have the circuit board 42 and the heat dissipation board 8 collectively constitute a flat plate like structure. The light guide plate 6 is supported on the flat plate like structure. While the overall thickness of the backlight module is reduced, the contact area between the circuit board 42 and the heat dissipation board 8 is increased to thereby enhance the heat dissipation performance. Further, in the instant embodiment, the heat dissipation board 8 is made of aluminum that has better heat conductivity so as to further improve the heat dissipation performance and enhance the quality of the backlight module.

The light guide plate 6 comprises a bottom surface 62 facing the bottom board 22, a top surface 64 arranged opposite to the bottom surface 62, and a plurality of side surfaces arranged between the bottom surface 62 and the top surface 64. The plurality of side surfaces comprises at least a light incidence surface 66. The LED lights 44 are arranged beside the light incidence surface 66 so as to form a side-edge backlight module. In the side-edge backlight module, the circuit board 42 is mounted on the bottom board 22 of the backplane 2 so as to effectively reduce the distance between the light guide plate 6 and the side boards 24 of the backplane 2 so as to facilitate bezel narrowing.

Referring to FIG. 5, the liquid crystal display panel 40 comprises a TFT (Thin-Film Transistor) substrate 402, and a CF (Color Film) substrate 404 laminated on the TFT substrate 402, and a liquid crystal layer 406 interposed between the TFT substrate 402 and the CF substrate 404. The TFT substrate 402 functions to drive liquid crystal molecules of the liquid crystal layer 406 to change direction so as to realize selection of light component. The CF substrate 404 functions to realize color displaying.

Further, the TFT substrate 402 comprises a first substrate 421, thin-film transistors 423 formed on one surface of the first substrate 421, and a first polarizer plate 425 formed on an opposite surface of the first substrate 421. The CF substrate 404 comprises a second substrate 441, color filter films 443 formed on a surface of the second substrate 441, and a second polarizer plate 445 formed on an opposite surface of the second substrate 441.

It is noted that the backlight module of the present invention may further comprise a reflector plate 9 arranged between the bottom board 22 and the light guide plate 6 and an optic film assembly 10 arranged on the light guide plate 6. The reflector plate 9 reflects light emitting from the backlight source 4 to enhance the illumination intensity of the backlight module. The optic film assembly 10 functions to homogenize light projecting from the light guide plate 6 so as to enhance the quality of the backlight module.

In summary, the present invention provides a backlight module and a liquid crystal display module using the backlight module, in which a first slope surface is provided on a circuit board of a backlight source and a second slope surface that mates the first slope surface is provided on the heat dissipation board, whereby with the first and second slope surfaces overlapping each other, the circuit board and the heat dissipation board collectively constitute a flat plate like structure with a light guide plate being directly supported on the flat plate like structure so as to reduce the overall thickness of the backlight module and at the same time to increase the contact area between the circuit board and the heat dissipation board to effectively improve the heat dissipation performance. Further, the circuit board is mounted on a bottom board of a backplane so as to effectively reduce the distance between the light guide plate and a side board of the backplane to facilitate bezel narrowing.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a backlight source mounted in the backplane, and a light guide plate mounted in the backplane, the backplane comprising a bottom board and a plurality of side boards perpendicularly connected to the bottom board, the backlight source comprising a circuit board and a plurality of LED (Light-Emitting Diode) lights mounted to and electrically connected with the circuit board, the circuit board being mounted to the bottom board, the LED lights being arranged at one side of the light guide plate, the circuit board comprising a first slope surface facing the bottom board, a heat dissipation board being arranged between the circuit board and the bottom board, the heat dissipation board comprising a second slope surface matchable with the first slope surface of the circuit board, the first slope surface and the second slope surface being set overlapping each other so as to have the circuit board and the heat dissipation board collectively constitute a flat plate like structure, the light guide plate being supported on the flat plate like structure;

wherein the first slope surface of the circuit board is positionable on the second slope surface of the heat dissipation board in such a way that an upper surface of the heat dissipation board is flush with an upper surface of the circuit board to collectively define a planar flat surface to support the light guide plate thereon so that a total height of the circuit board and the heat dissipation board in a direction normal to the planar flat surface is reduced and a contact area between the circuit board and the heat dissipation board is expanded.

2. The backlight module as claimed in claim 1, wherein the heat dissipation board is made of aluminum.

3. The backlight module as claimed in claim 1 further comprising a reflector plate arranged between the bottom board and the light guide plate and an optic film assembly arranged on the light guide plate.

4. The backlight module as claimed in claim 1, wherein the light guide plate comprises a bottom surface facing the bottom board, a top surface arranged opposite to the bottom surface, and a plurality of side surfaces arranged between the bottom surface and the top surface, the plurality of side surfaces comprising at least a light incidence surface, the LED lights being arranged beside the light incidence surface.

5. A liquid crystal display module, comprising: a backlight module, a mold frame mounted on the backlight module, and a liquid crystal display panel mounted on the mold frame, the backlight module comprising: a backplane, a backlight source mounted in the backplane, and a light guide plate mounted in the backplane, the backplane comprising a bottom board and a plurality of side boards perpendicularly connected to the bottom board, the backlight source comprising a circuit board and a plurality of LED (Light-Emitting Diode) lights mounted to and electrically connected with the circuit board, the circuit board being mounted to the bottom board, the LED lights being arranged at one side of the light guide plate, the circuit board comprising a first slope surface facing the bottom board, a heat dissipation board being arranged between the circuit board and the bottom board, the heat dissipation board comprising a second slope surface matchable with the first slope surface of the circuit board, the first slope surface and the second slope surface being set overlapping each other so as to have the circuit board and the heat dissipation board collectively constitute a flat plate like structure, the light guide plate being supported on the flat plate like structure;

wherein the first slope surface of the circuit board is positionable on the second slope surface of the heat dissipation board in such a way that an upper surface of the heat dissipation board is flush with an upper surface of the circuit board to collectively define a planar flat surface to support the light guide plate thereon so that a total height of the circuit board and the heat dissipation board in a direction normal to the planar flat surface is reduced and a contact area between the circuit board and the heat dissipation board is expanded.

6. The liquid crystal display module as claimed in claim 5, wherein the heat dissipation board is made of aluminum.

7. The liquid crystal display module as claimed in claim 5, wherein the backlight module further comprises a reflector plate arranged between the bottom board and the light guide plate and an optic film assembly arranged on the light guide plate.

8. The liquid crystal display module as claimed in claim 5, wherein the light guide plate comprises a bottom surface facing the bottom board, a top surface arranged opposite to the bottom surface, and a plurality of side surfaces arranged between the bottom surface and the top surface, the plurality of side surfaces comprising at least a light incidence surface, the LED lights being arranged beside the light incidence surface.

9. The liquid crystal display module as claimed in claim 5, wherein the liquid crystal display panel comprises a TFT (Thin-Film Transistor) substrate, a CF (Color Filter) substrate laminated on the TFT substrate, and a liquid crystal layer interposed between the TFT substrate and the CF substrate.

10. The liquid crystal display module as claimed in claim 9, wherein the TFT substrate comprises a first substrate, a thin-film transistor formed on one surface of the first substrate, and a first polarizer plate formed on an opposite surface of the first substrate and the CF substrate comprises a second substrate, a color filter film formed on a surface of the second substrate, and a second polarizer plate formed on an opposite surface of the second substrate.

11. A liquid crystal display module, comprising: a backlight module, a mold frame mounted on the backlight module, and a liquid crystal display panel mounted on the mold frame, the backlight module comprising: a backplane, a backlight source mounted in the backplane, and a light guide plate mounted in the backplane, the backplane comprising a bottom board and a plurality of side boards perpendicularly connected to the bottom board, the backlight source comprising a circuit board and a plurality of LED (Light-Emitting Diode) lights mounted to and electrically connected with the circuit board, the circuit board being mounted to the bottom board, the LED lights being arranged at one side of the light guide plate, the circuit board comprising a first slope surface facing the bottom board, a heat dissipation board being arranged between the circuit board and the bottom board, the heat dissipation board comprising a second slope surface matchable with the first slope surface of the circuit board, the first slope surface and the second slope surface being set overlapping each other so as to have the circuit board and the heat dissipation board collectively constitute a flat plate like structure, the light guide plate being supported on the flat plate like structure; wherein the heat dissipation board is made of aluminum and wherein the first slope surface of the circuit board is positionable on the second slope surface of the heat dissipation board in such a way that an upper surface of the heat dissipation board is flush with an upper surface of the circuit board to collectively define a planar flat surface to support the light guide plate thereon so that a total height of the circuit board and the heat dissipation board in a direction normal to the planar flat surface is reduced and a contact area between the circuit board and the heat dissipation board is expanded.

12. The liquid crystal display module as claimed in claim 11, wherein the backlight module further comprises a reflector plate arranged between the bottom board and the light guide plate and an optic film assembly arranged on the light guide plate.

13. The liquid crystal display module as claimed in claim 11, wherein the light guide plate comprises a bottom surface facing the bottom board, a top surface arranged opposite to the bottom surface, and a plurality of side surfaces arranged between the bottom surface and the top surface, the plurality of side surfaces comprising at least a light incidence surface, the LED lights being arranged beside the light incidence surface.

14. The liquid crystal display module as claimed in claim 11, wherein the liquid crystal display panel comprises a TFT (Thin-Film Transistor) substrate, a CF (Color Filter) substrate laminated on the TFT substrate, and a liquid crystal layer interposed between the TFT substrate and the CF substrate.

15. The liquid crystal display module as claimed in claim 14, wherein the TFT substrate comprises a first substrate, a thin-film transistor formed on one surface of the first substrate, and a first polarizer plate formed on an opposite surface of the first substrate and the CF substrate comprises a second substrate, a color filter film formed on a surface of the second substrate, and a second polarizer plate formed on an opposite surface of the second substrate.

* * * * *